United States Patent [19]
Robinson

[11] Patent Number: 5,821,993
[45] Date of Patent: Oct. 13, 1998

[54] METHOD AND SYSTEM FOR AUTOMATICALLY CALIBRATING A COLOR CAMERA IN A MACHINE VISION SYSTEM

[75] Inventor: David A. Robinson, Northants, Great Britain

[73] Assignee: Medar, Inc., Farmington Hills, Mich.

[21] Appl. No.: 591,130

[22] Filed: Jan. 25, 1996

[51] Int. Cl.$^6$ .................................................. H04N 17/02
[52] U.S. Cl. ........................ 348/187; 348/188; 382/167
[58] Field of Search .................... 348/175, 176, 348/187, 188, 652, 653, 654, 655, 656, 657, 658, 672; 364/571.01, 571.02, 571.04; 382/167, 274, 275; H04N 9/73, 17/02

[56] References Cited

U.S. PATENT DOCUMENTS

| | | | |
|---|---|---|---|
| 4,379,292 | 4/1983 | Minato et al. | 348/655 |
| 4,554,952 | 11/1985 | Pham Van Cang | 348/188 |
| 5,130,935 | 7/1992 | Takiguchi | 371/571.02 |
| 5,159,185 | 10/1992 | Lehr | 250/205 |
| 5,179,437 | 1/1993 | Kawada et al. | 348/188 |
| 5,202,767 | 4/1993 | Dozier et al. | 348/273 |
| 5,216,504 | 6/1993 | Webb et al. | 348/190 |
| 5,231,481 | 7/1993 | Eouzan et al. | 348/658 |
| 5,293,225 | 3/1994 | Nishiyama | 348/242 |
| 5,327,226 | 7/1994 | Tanabe | 348/188 |
| 5,363,318 | 11/1994 | McCauley | 364/571.01 |
| 5,442,408 | 8/1995 | Haruki et al. | 348/655 |
| 5,453,840 | 9/1995 | Parker et al. | 348/188 |
| 5,481,302 | 1/1996 | Yamamoto et al. | 348/655 |
| 5,644,359 | 7/1997 | Ito | 348/228 |

*Primary Examiner*—Sherrie Hsia
*Attorney, Agent, or Firm*—Brooks & Kushman P.C.

[57] ABSTRACT

A pair of calibration algorithms are provided for calibrating a color camera in a machine vision system. The first and most general form of the calibration algorithm requires that a calibration target be shown to a well adjusted machine vision system. The calibration target contains samples of red, green and blue. A gray level histogram is taken of each of the resulting red, green and blue images and is used to generate corresponding standard cumulative probability functions. The standard cumulative probability functions, together with a copy of the calibration target, is provided to a machine vision system having its own color camera which requires calibration. The same above-noted steps are repeated for this system and the resulting cumulative probability functions are compared to the corresponding standard cumulative probability functions to obtain gains for the red, green and blue channels of the camera to be calibrated. In the second simplified version of the calibration algorithm, a target patch of pure white is provided and camera outputs for red, green and blue are determined while observing the patch. The average gain for each of the output channels of the color camera is determined. This simplifies to taking the average white level measured for each of the channels and dividing the average white value into the full scale value of the machine vision system to be calibrated. Applying the three gain factors determined under either version of the algorithm to a subsequent image allows one to end up with a color-corrected image.

12 Claims, 5 Drawing Sheets

METHOD AND SYSTEM FOR AUTOMATICALLY CALIBRATING A COLOR CAMERA IN A MACHINE VISION SYSTEM

CROSS-REFERENCE TO RELATED APPLICATION

This application is related to U.S. patent application entitled "Method and System for Automatically Monitoring the Color of an Object at a Vision Station", filed on Jan. 25, 1996 and having U.S. Ser. No. 08/591,027, U.S. Pat. No. 5,764,386.

TECHNICAL FIELD

This invention is related to methods and systems for automatically calibrating color cameras such as RGB cameras and, in particular, to methods and systems for automatically calibrating color cameras in machine vision systems.

BACKGROUND ART

The fidelity of an image taken using a color camera relies on several factors, such as quality of the camera and lens, uniformity of the illumination, the color of the illumination (color temperature), the relationship between the intensity of the light corresponding to the red, green and blue (i.e., R, G and B) components of the image and the signal output from the camera on the relevant channels (i.e., color gains).

Compared with other types of color sensors, even the best high resolution color television cameras make poor color monitoring systems. Conventional colorimeters and densitometers essentially monitor spot or local colors, and do so with a rigorously controlled light source and often with only one light sensor connected to precision calibrated electronics.

A color camera by contrast observes a large area of an object within the order of 1 million or more independent detector elements, being fed into three independent color channels corresponding to the red, green and blue regions of the spectrum. Invariably, these channels are equipped with manual gain adjustments so that the resulting picture can be set up to produce a subjectively pleasing image on the monitor. In addition, the colors reflected from the object being observed are directly modified by the color temperature of the illumination source, an effect that the untrained human eye is very insensitive to do.

Thus, when using a color camera as a color measurement tool rather than a simple component in a remote image transfer mechanism, characteristics that are largely irrelevant in the latter mode now become vitally important.

Consequently, any color comparison operation requires precise control of the image illumination, both in intensity and color, and also requires a very difficult camera set-up operation to ensure that all cameras undertaking the comparison operation are set up in an identical fashion, and are totally free from electronic drift. Despite the above-mentioned drawbacks, a color camera augmented by a fast image processing system offers fast area color comparisons in production-type environments that are virtually impossible using any of the more conventional color measurement techniques. However, vitally important to achieving any of the promised potential, the system has to be able to overcome the changes in hue due to modifications to color temperature of the illumination, due to perhaps power fluctuations, or replacement of light sources, etc. Since no two color cameras give color images that are exactly the same, to make any system viable it must be possible to interchange any color camera with an identical unit without the requirement for adjusting the individual channel gains manually in an attempt to compare an image taken on this system with a template that has perhaps been captured on a totally different system whose camera may be set up with a totally different set of gains.

The Haruki et al. U.S. Pat. No. (5,442,408) is entitled "White Balance Adjusting Apparatus for Automatically Adjusting White Balance in Response to Luminance Information Signal and a Color Information Signal Obtained From Image Sensing Device." A color evaluating value correcting circuit determines whether the color evaluating values are within a predetermined color temperature distribution range. If not, adjustments are made to automatically bring these values within the desired range. Gain control circuits control the gains of the amplifying circuits so that picture color evaluating values are normalized.

The Dozier et al. U.S. Pat. No. (5,202,767) is entitled "Multimode Computerized Multicolor Camera and Method Therefor." The system described therein has the following features: 1) a computerized multicolor camera operates over a wide range of light levels; 2) there is an exact frame-to-frame registration of all colors of the multi-color image of a defined object without pixel jitter; 3) irregularities in the image sensor (the camera) are compensated for. The computer control for this device is internal. Digital representation of images are generated by the camera at the three primary colors (red, green and blue). An amplification and designation circuit allows for the photometric compensation of the uncompensated pixel values using a compensation table and allows for the storage of a compensated digital signal representation of an image in digital memory.

The McCauley U.S. Pat. No. (5,363,318) is entitled "Method and Apparatus for Adaptive Color Characterization and Calibration." A device described therein functions to provide a system which independently corrects the color channels by providing independent color correction curves which together are constrained to provide a color balanced response. In addition, this system simultaneously corrects for saturation effects and linearizes device response in an effort to utilize the entire dynamic range of the sensing device. A typical system as envisioned in the primary embodiment will utilize a personal computer such as an IBM or an Apple.

The Tanabe U.S. Pat. No. (5,327,226) is entitled "Method and System for Automatically Adjusting Color Balance of a TV Camera." The device described therein provides for an automatic color setup system in which a white level, a black level, and a grey level are determined by analysis of image signal data derived from a standard image. These values are supplied to a CPU through a buffer memory. The CPU includes a division processing section, an adequate block selecting section, a measurement region determining section and a color balance adjusting section.

The Nishiyama et al. U.S. Pat. No. (5,293,225) is entitled "Digital Signal Processing System for a Color Camera Apparatus Including Separate Delays for Color Signal and Brightness Signal Processing." An auto signal processing circuit receives presently processing signal amplitude data from a brightness signal processing circuit and a color signal processing circuit, and outputs system control data to a micro computer via a data bus.

The Lehr U.S. Pat. No. (5,159,185) is entitled "Precise Color Analysis Apparatus Using Color Standard." Digital signals are sent to a computer which first averages the output signals of the camera in each of the color channels for that portion of the camera output signal which represents the location of the standard tile, and then compares at least one of the averaged camera signals to information in the computer memory which has been derived from previous readings for the standard tile. If the average camera signal does not match the information in the computer memory, the computer sends signals to the lamp control circuit which adjusts the lamp output to the appropriate direction and amount until the averages camera signal information is matched.

The Kawada et al. U.S. Pat. No. (5,179,437) is entitled "Apparatus For Color Correction Of Image Signals Of A Color Television Camera." A CPU compares an image signal obtained by processing a pick up signal with an image signal from the test chart signal-generating circuit. A color correction circuit takes the results and makes the appropriate corrections.

The Webb et al. U.S. Pat. No. (5,216,504) is entitled "Automatic Precision Video Monitor Alignment System." A pickup camera transmits a digital signal to a calibration computer via a video coprocessor subsystem. This system functions to precisely align all the adjustable display characteristics of a video monitoring system. To allow for accurate tracking of color temperature at any brightness or contrast setting, 12 adjustments are made for each desired color temperature. These are divided into four (4) groups for each color (red, green and blue): Brightness Maximum, Brightness Minimum, Contrast Maximum and Contrast Minimum. The amount of each is precisely set for the proper color temperature.

Summary Of The Invention

An object of the present invention is to provide a computer-controlled method and system for calibrating a color camera such as a RGB camera wherein any measurement taken by the camera is independent of both the color temperature of any illumination, and the gain settings of the camera RGB sensors.

Another object of the present invention is to provide a computer-controlled method and system for calibrating a color camera such as a RGB camera wherein the computer determines a set of constants derived by observing a standard image and wherein a set of constants essentially equalize all color camera/light source combinations, without the need for any but the most rudimentary camera set-up.

Still yet another object of the present invention is to provide a computer-controlled method and system for calibrating a color camera such as a RGB camera wherein a master image is presented to the camera, consisting of known colors and wherein the output image of the color camera is compared to the known master, upon which gains offsets and look up table data are generated.

In carrying out the above objects and other objects of the present invention, a method is provided for automatically calibrating a color camera having output channels in a machine vision system. The method includes the steps of providing an initial set of calibration data and a calibration target having a pure white region and utilizing the color camera to generate a target image containing the target with the pure white region for each of the output channels. The method further includes the step of measuring an output of each of output channels during the step of utilizing to obtain output measurements. Finally, the method includes the step of computing a final set of calibration data to calibrate the camera in the machine vision system from the output measurements and the initial set of calibration data.

Further in carrying out the above objects and other objects of the present invention, a system is provided for carrying out each of the above-noted method steps.

The above objects and other objects, features, and advantages of the present invention are readily apparent from the following detailed description of the best mode for carrying out the invention when taken in connection with the accompanying drawings.

Brief Description Of The Drawings FIG. 1 is a schematic diagram illustrating a machine vision system and station at which the method and system of the present invention can automatically calibrate a color camera thereof;

BEST MODES FOR CARRYING OUT THE INVENTION

Figure 1:
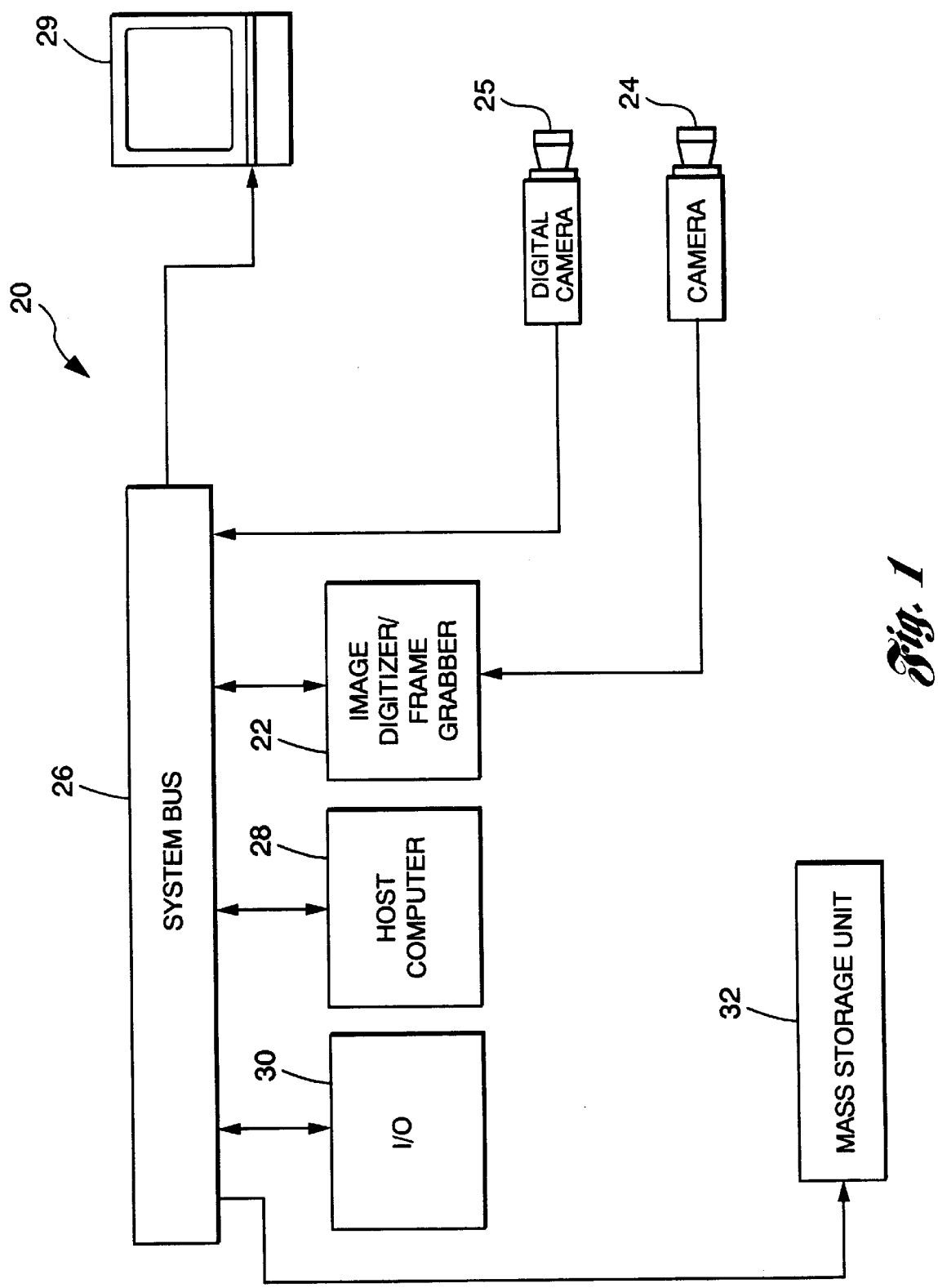

Referring to the drawing Figures, there is illustrated schematically in FIG. 1, a machine vision system and station, generally indicated at 20, by which the method and system of the present invention can automatically calibrate a color camera such as a RGB camera therein. While RGB cameras are most widely used, the method and system of the invention could also be used with cameras having other types of channels such as Cyan, Magenta and Yellow channels.

The machine vision system 20 typically includes an image digitizer/frame grabber 22. The image digitizer/frame grabber 22 samples and digitizes input images from an image source such as a camera 24 and places each input image into a frame buffer having picture elements. Each of the picture elements may consist of an 8-bit number representing the brightness of that spot in the image. A digital camera 25 may be provided to eliminate the need for the image digitizer/frame grabber 22.

The system 20 also includes input/output circuits 30 to allow the system 20 to communicate with external devices such as a controller for controlling an offset printing machine (not shown).

The camera 24 may be an image source such as an analog, digital or line scan camera such as RS-170, CCIR, NTSC and PAL.

The system bus 26 may be either a PCI, an EISA, ISA or VL system bus or any other standard bus to allow inter-system communication such as at a monitor 29 of the system 20.

The image digitizer/frame grabber 22 may be a conventional frame grabber board such as that manufactured by Matrox, Cognex, Data Translation or other frame grabbers.

Alternatively, the image digitizer/frame grabber 22 may comprise a vision processor board such as made by Cognex.

The machine vision system 20 may be programmed at a mass storage unit 32 to include custom controls for image processing and image analysis. Examples of image processing may include linear and non-linear enhancement, morphology, color and image arithmetic. Also, image analysis may include search, edge, caliper, blob, template, color, 2-D and 3-D measurements.

A computer 28 of the system 20 may be a Pentium-based IBM compatible PC or other PC having a sufficient amount of RAM and hard disk space for performing the calibration algorithms associated with the present invention.

An image of the present invention can be thought of as consisting of three components or sub-images. These images are essentially monochrome. These images correspond to the red, green and blue components of the colored image. The actual physical object forming the image consists of regions where the amount of the incident light of each color reflected from, or transmitted through the object essentially changes, thus providing the image detail. It is this change in reflectance (or transmittance) that provides valuable information. However, the information that the computer 28 receives is somewhat diluted. It consists of the product of the reflectance/transmittance of the point, the intensity of the illumination at that point, the amount of light allowed through the lens (i.e. f stop of the lens), the sensitivity of the sensor in the CCD array, and finally the gain of the following electronics. Subject to these parameters staying stable over a short period of time, the signal obtained is directly proportional to the desired signal. However, the major problem is that the constant of proportionality varies between the red, green and blue channels. It is this coefficient that the calibration method and system of the present invention normalizes.

A calibration algorithm of the method and system is first described generally hereinbelow. Then, another version of the algorithm, significantly simplified for speed, is described.

Figure 2:
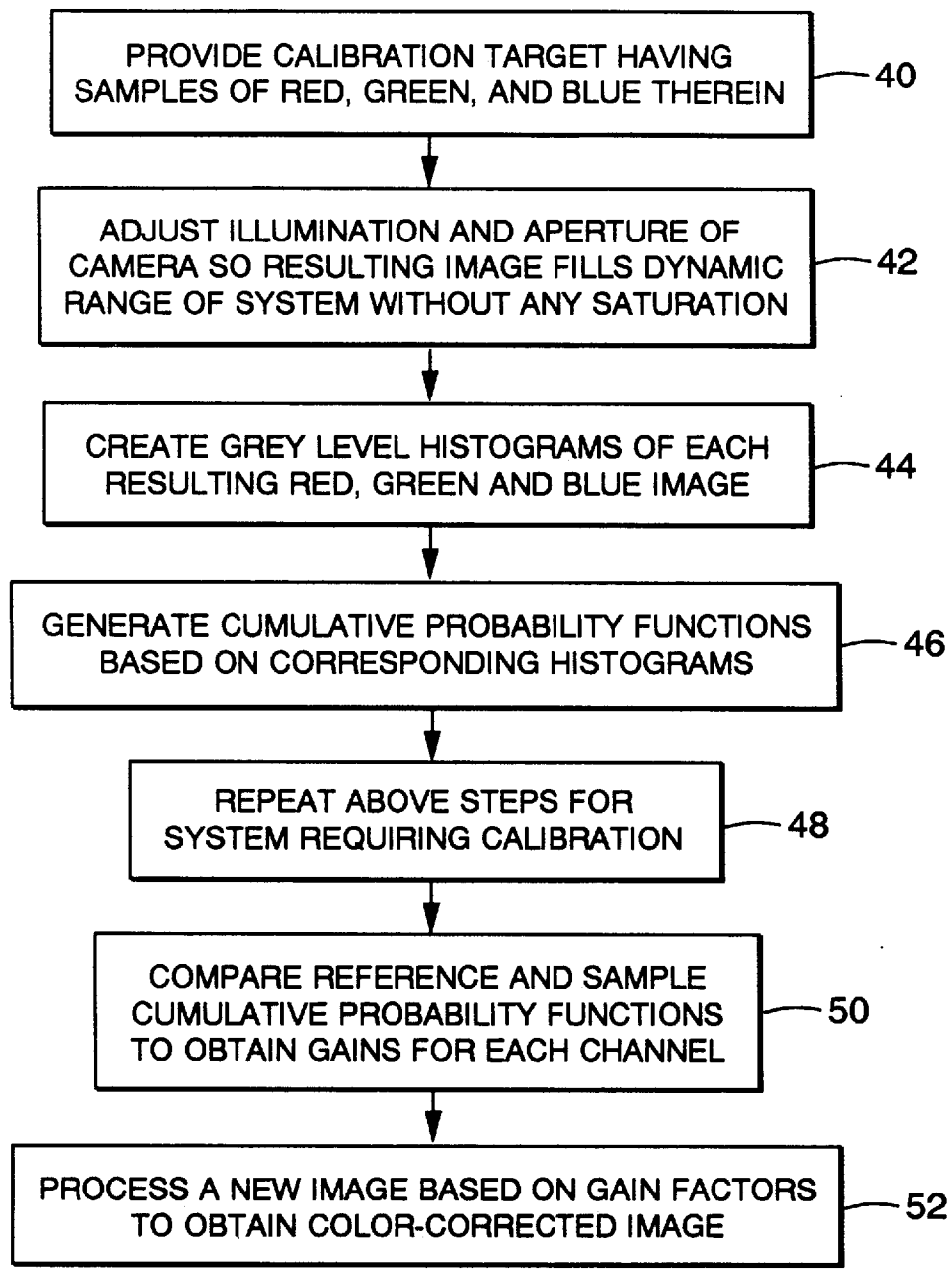
FIG. 2 is a block diagram flow chart illustrating a calibration algorithm of the present invention.

Referring now to FIG. 2, there is illustrated in block diagram flow chart form, a step at block 40 of showing a calibration target to a typical "well adjusted" machine vision system. The only requirement for the calibration target is that the red, green and blue components of the image have a representative distribution. In other words, calibration cannot be accomplished using a calibration image having zero energy in one or more color channels.

At block 42, the illumination and aperture of the camera 24 must be adjusted so that the resulting image fills the dynamic range of the system without sending it into saturation in any part of the image.

Figure 3:
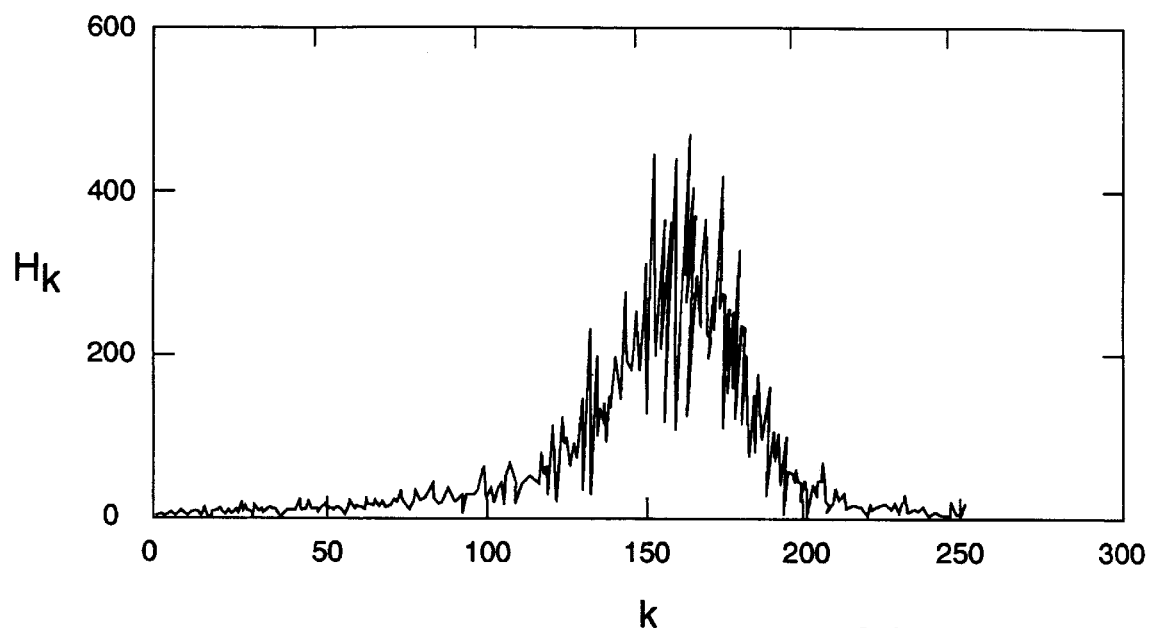
FIG. 3 is a "gray level" histogram taken of resulting red, green and blue images in a "well adjusted" machine vision system.

At block 14, a "gray level" histogram is generated for the resulting red, green and blue images. One such histogram could well look like the one in FIG. 3.

Figure 4:
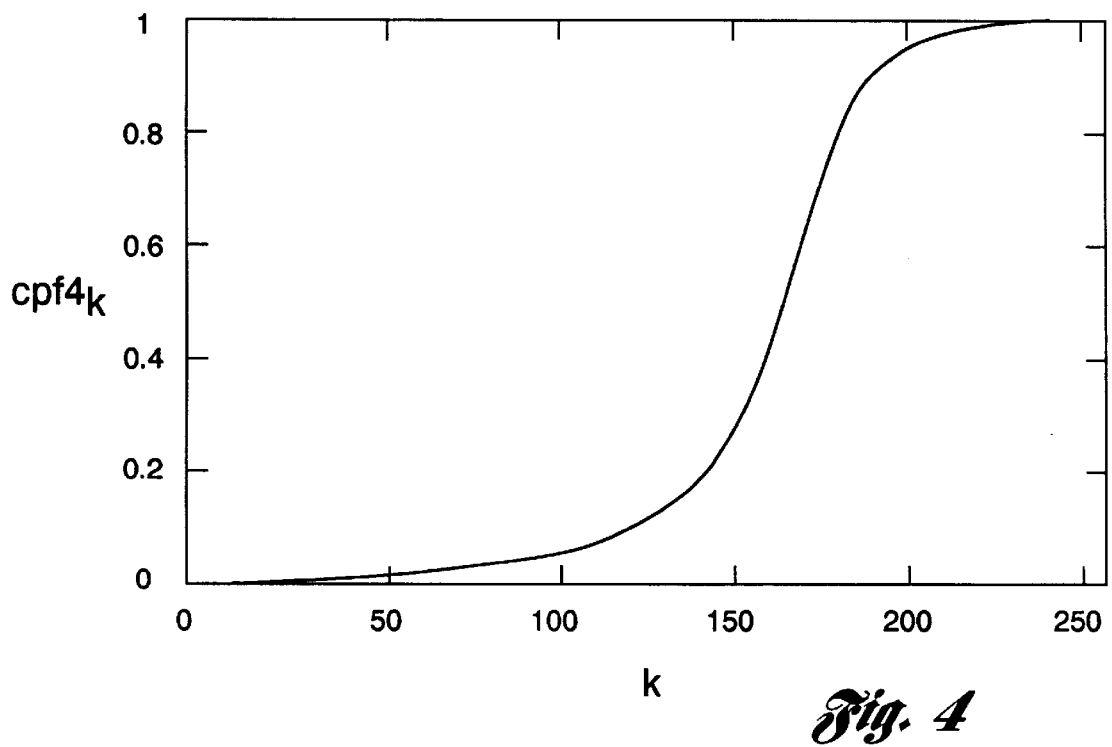
FIG. 4 is a graph of a cumulative probability function generated from the histogram of FIG. 3.

At block 46, this data is used to generate a standard cumulative probability function which is shown in FIG. 4.

The cumulative probability is effectively the normalized integral of the original histogram, and is defined as:

$$\text{Cumulative\_Histogram}_x = \sum_{n=0}^{x} \text{Histogram}_n$$

$$CPF_n = \frac{\text{Cumulative\_Histogram}_n}{\text{Cumlative\_Histogram}}$$

One would have three of these cumulative probability maps—one for each channel. These are important to the calibration procedure and would be provided to every machine vision system needing calibration together with a high quality copy of the calibration target.

Figure 5:
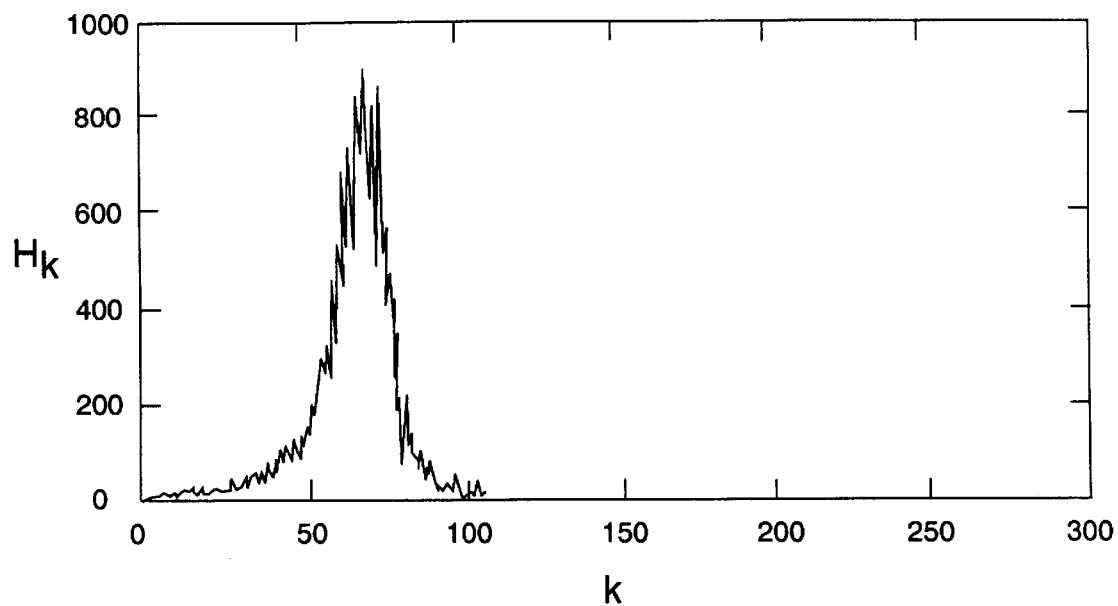
FIG. 5 is a graph of a "gray level" histogram taken of resulting red, green and blue images in a system requiring calibration.

At block 48, calibration is achieved by repeating the above-noted process on the system requiring calibration. The resulting histogram of this process for one channel (in much exaggerated form) is shown in FIG. 5.

Figure 6:
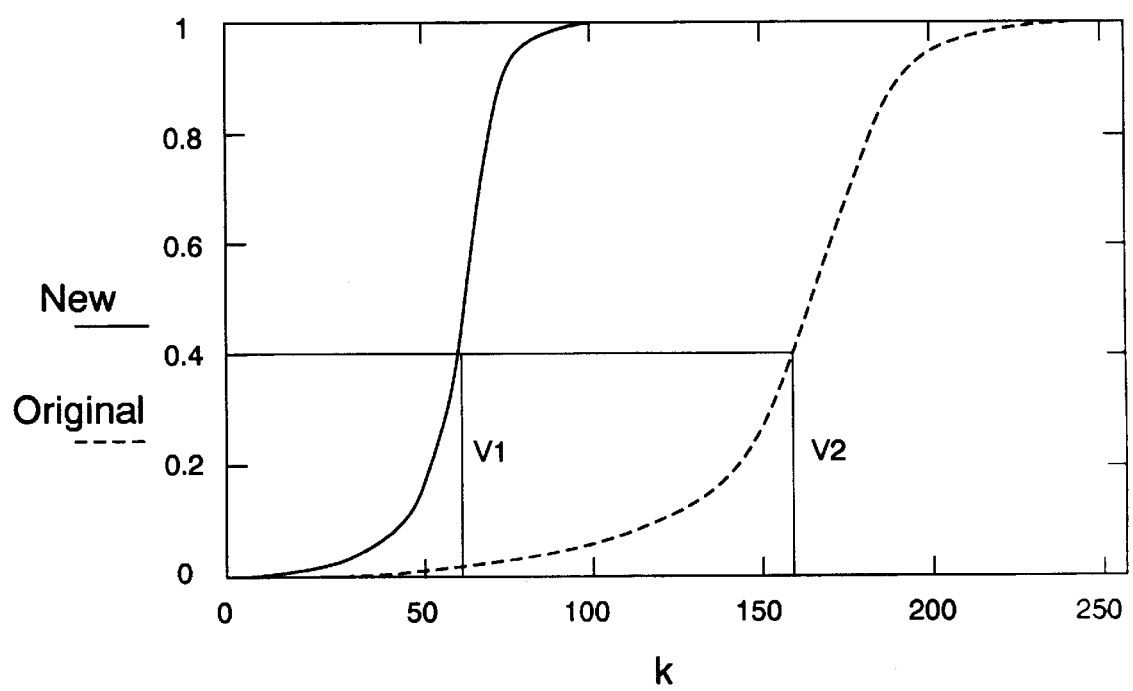
FIG. 6 is a graph of the cumulative probability function of FIG. 4 together with a graph of the cumulative probability function generated from the histogram of FIG. 5.

At block 50, the cumulative probability function from this histogram is compared with the standard cumulative probability function to obtain the graph of FIG. 6.

The latter histogram is more "squashed" because either the illumination isn't as bright, the aperture is wrongly set, or the gain of this particular channel is differently adjusted or a combination of the above. The correction factor or gain for this particular color channel is computed which will equalize the calibration image taken on the original machine with the new one image. Since one is looking at an identical object in both cases, then the two cumulative probability functions should exactly overlay. The fact they don't means one needs to compensate. One does this by adding horizontal lines and determining where they cross the two curves, such as is shown by the line intercepting the new curve at V1 and the original curve at V2. The gain is computed as:

$$\gamma = \frac{V2}{V1}$$

This process can be repeated for as many points as one likes to obtain a good average gain.

The process yields three values for the gain The first value is for the red channel. The second value is for the green channel and the third value for the blue channel.

At block 52, these gains can then be applied to any further image coming into the system, leaving one confident that the resulting image will, at least as far as color balance is concerned, be identical to the results taken on the original adjusted system.

Figure 7:
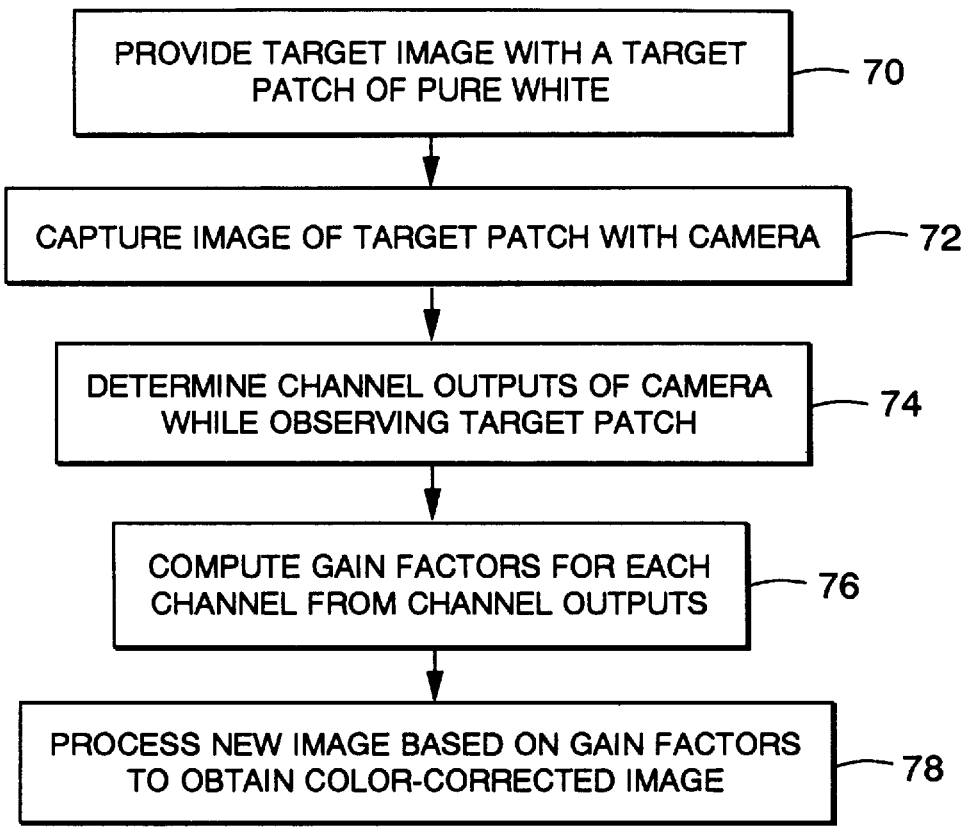
FIG. 7 is a block diagram flow chart illustrating a simplified calibration algorithm of the present invention.

Often there may be a situation where the calibration needs to be done on a per image basis, rather than undertaken on a one-off procedure. Referring to FIG. 7, there is illustrated in block diagram flow chart form, the same algorithm in a much simplified form. One effectively "invents" a hypothetical standard machine, and present this with an imaginary reference image consisting of a pure white object. The results that one gets, of course, is that each channel of this machine will produce exactly full scale (probably 255 for 8 bit arithmetic).

Now, if one includes somewhere in the image of a real operating system a target patch of pure white (i.e. block 70), then providing one can identify this patch (i.e. block 72) and determine the camera output for R, G and B while observing it (i.e. block 74) one can find the average gain for each of the channels. This essentially simplifies to taking the average white level measured for each of the channels and dividing this into 255, or whatever the full scale value of the numbering system represents (i.e. block 76). Applying these three gain factors to the complete image, one ends up with a color corrected image (i.e. block 78).

In other words, at block 74, the average intensity of the white region of interest is measured for the red, green and blue channels of the camera 24. At block 76, the individual gains are then computed as:

$$\gamma_{red} = \frac{255}{\mu_{red}}$$

-continued $$\gamma_{green} = \frac{255}{\mu_{green}}$$

$$\gamma_{blue} = \frac{255}{\mu_{blue}}$$

Here, γ are the gains and μ are the mean values for the white calibration area.

At block 78, the complete image of the calibration target is processed by multiplying by the relevant gain as shown below:

Corrected_Image$_{red_{row, column}}$ = Image$_{red_{row, column}}$·γ$_{red}$
Corrected_Image$_{green_{row, column}}$ = Image$_{green_{row, column}}$·γ$_{green}$
Corrected_Image$_{blue_{row, column}}$ = Image$_{blue_{row, column}}$·γ$_{blue}$ While the best mode for carrying out the invention has been described in detail, those familiar with the art to which this invention relates will recognize various alternative designs and embodiments for practicing the invention as defined by the following claims.

What is claimed is:

1. A computer-controlled method for automatically calibrating a first color camera having output channels in a machine vision system, the method comprising the steps of:
    providing a calibration target to an adjusted machine vision system including a second color camera having output channels;
    generating a calibration image from each output channel of the second color camera from the calibration target;
    generating an initial set of calibration data based on the calibration images;
    utilizing the first color camera to generate an initial target image containing the calibration target for each of the output channels;
    measuring an output of each of the output channels during the step of utilizing to obtain output measurements;
    computing a final set of calibration data from the output measurements and the initial set of calibration data; and
    applying the final set of calibration data to each subsequent image acquired by the color camera to obtain a color-corrected image.

2. The method as claimed in claim 1 wherein the initial set of calibration data includes a first set of cumulative probability functions based on the calibration images.

3. The method as claimed in claim 2 wherein the step of computing includes the steps of generating a second set of cumulative probability functions corresponding to the target images and comparing the first and second sets of cumulative probability functions to obtain the final set of calibration data.

4. The method as claimed in claim 1 wherein the first color camera is a RGB color camera.

5. A computer-controlled system for automatically calibrating a first color camera having output channels in a machine vision system, the system comprising:
    an adjusted machine vision system including a second color camera having output channels, the adjusted machine vision system including means for generating a calibration image from each output channel of the second color camera from a calibration target and means for generating an initial set of calibration data based on the calibration image;
    means for storing the initial set of calibration data;
    the first color camera generating an initial target image containing the calibration target for each of the output channels;
    means for measuring an output of each of the output channels during generation of the initial target images to obtain output measurements, computing a final set of calibration data from the output measurements and the initial set of calibration data and applying the final set of calibration data to each subsequent image acquired by the first color camera to obtain a color corrected image.

6. The system as claimed in claim 5 wherein the initial set of calibration data includes a first set of cumulative probability functions based on the calibration images.

7. The system as claimed in claim 6 wherein the means for computing includes means for generating a second set of cumulative probability functions corresponding to the target images and means for comparing the first and second sets of cumulative probability functions to obtain the final set of calibration data.

8. The system as claimed in claim 5 wherein the first color camera is a RGB color camera.

9. The method as claimed in claim 1 wherein the calibration target has red, green and blue components.

10. The method as claimed in claim 1, wherein the calibration target has a pure white region.

11. The system as claimed in claim 5 wherein the calibration target has red, green and blue components.

12. The system as claimed in claim 5 wherein the calibration target has a pure white region.

* * * * *